(12) United States Patent
Kashiwagi et al.

(10) Patent No.: US 8,651,413 B2
(45) Date of Patent: Feb. 18, 2014

(54) LIGHTNING-PROTECTION FASTENER

(75) Inventors: Masahiro Kashiwagi, Nagasaki (JP); Yuichiro Kamino, Nagoya (JP); Kazuyuki Oguri, Nagoya (JP); Takeyasu Tarumi, Nagoya (JP); Masahiro Bessho, Nagoya (JP); Hideo Yamakoshi, Nagoya (JP); Naomoto Ishikawa, Nagoya (JP)

(73) Assignee: Mitsubishi Heavy Industries, Tokyo (JP)

( * ) Notice: Subject to any disclaimer, the term of this patent is extended or adjusted under 35 U.S.C. 154(b) by 715 days.

(21) Appl. No.: 12/677,380

(22) PCT Filed: Sep. 25, 2008

(86) PCT No.: PCT/JP2008/067230
§ 371 (c)(1),
(2), (4) Date: Mar. 10, 2010

(87) PCT Pub. No.: WO2009/041459
PCT Pub. Date: Apr. 2, 2009

(65) Prior Publication Data
US 2010/0320315 A1 Dec. 23, 2010

(30) Foreign Application Priority Data
Sep. 28, 2007 (JP) .................. 2007-255438

(51) Int. Cl.
*B64D 45/02* (2006.01)
*B64C 1/12* (2006.01)

(52) U.S. Cl.
USPC ....... 244/1 A; 244/132; 204/196.18; 361/218; 361/216; 411/377

(58) Field of Classification Search
USPC ....... 244/1 A, 132, 129.1; 361/218, 217, 212; 428/116
See application file for complete search history.

(56) References Cited

U.S. PATENT DOCUMENTS

| 2,326,455 A | 8/1943 | Gray |
| 3,494,243 A | 2/1970 | Kleinhenn |

(Continued)

FOREIGN PATENT DOCUMENTS

| CN | 2354219 | 12/1999 |
| EP | 1 772 376 | 4/2007 |

(Continued)

OTHER PUBLICATIONS

Russian Office Action issued Mar. 15, 2011 in Russian Patent Application No. 2010110673 w/a letter containing a concise statement of relevancy in the English language.

(Continued)

*Primary Examiner* — Rob Swiatek
*Assistant Examiner* — George Andonyan
(74) *Attorney, Agent, or Firm* — Wenderoth, Lind & Ponack, L.L.P.

(57) ABSTRACT

A lightning-protection fastener is provided that is capable of reliably preventing peeling off of an insulation layer during the operation of an aircraft and improving the anti-lightning-strike capability and reliability. There is a lightning-protection fastener that fastens a skin of an aircraft and a structural member positioned inside the skin, in which an insulation layer is melt adhered so as to cover one end surface of a head portion and also to mechanically engage with a fastener-side engagement portion (engagement portion) formed on the end surface.

21 Claims, 10 Drawing Sheets

(56) References Cited

U.S. PATENT DOCUMENTS

| | | | |
|---|---|---|---|
| 3,618,444 | A | 11/1971 | Kay et al. |
| 3,755,713 | A | 8/1973 | Paszkowski |
| 4,235,147 | A | 11/1980 | Weidner, Jr. |
| 4,316,690 | A | 2/1982 | Voller |
| 4,460,300 | A | 7/1984 | Bettini et al. |
| 4,502,092 | A * | 2/1985 | Bannink et al. ............... 361/218 |
| 4,628,402 | A | 12/1986 | Covey |
| 4,630,168 | A * | 12/1986 | Hunt ............................. 361/218 |
| 4,681,497 | A * | 7/1987 | Berecz .......................... 411/377 |
| 4,755,904 | A | 7/1988 | Brick |
| 4,884,929 | A | 12/1989 | Smith et al. |
| 5,035,764 | A | 7/1991 | Blake |
| 5,845,872 | A | 12/1998 | Pridham et al. |
| 5,868,356 | A * | 2/1999 | Giedris ......................... 244/132 |
| 6,679,667 | B2 * | 1/2004 | Brown et al. ................. 411/377 |
| 7,050,286 | B2 | 5/2006 | Pridham et al. |
| 7,883,050 | B2 * | 2/2011 | Dufresne et al. .............. 244/1 A |
| 2005/0103936 | A1 | 5/2005 | Pridham et al. |
| 2006/0141242 | A1 | 6/2006 | Keener et al. |
| 2006/0177284 | A1 | 8/2006 | Keener et al. |
| 2007/0081874 | A1 | 4/2007 | Kamino et al. |
| 2008/0137259 | A1* | 6/2008 | Heeter et al. .................. 361/218 |
| 2010/0108804 | A1 | 5/2010 | Oguri et al. |

FOREIGN PATENT DOCUMENTS

| | | |
|---|---|---|
| FR | 1 069 237 | 7/1954 |
| JP | 48-13892 | 5/1973 |
| JP | 62-143800 | 6/1987 |
| JP | 3-18045 | 3/1991 |
| JP | 3-502357 | 5/1991 |
| JP | 9-144734 | 6/1997 |
| JP | 10-184633 | 7/1998 |
| JP | 2001-93336 | 4/2001 |
| JP | 2001-240953 | 9/2001 |
| JP | 2007-5442 | 1/2007 |
| JP | 2007-126119 | 5/2007 |

OTHER PUBLICATIONS

Japanese Office Action issued Nov. 6, 2012 in corresponding Japanese Application No. 2011-029237 (with English translation).
Japanese Office Action issued Nov. 6, 2012 in corresponding Japanese Application No. 2011-029238 (with English translation).
Notice of Allowance issued on Aug. 31, 2012 in U.S. Appl. No. 12/525,177.
Canadian Office Action issued Aug. 29, 2011 in corresponding Canadian Patent Application No. 2,700,615.
Supplementary European Search Report issued Sep. 13, 2011 in corresponding European Patent Application No. 08833183.0.
International Search Report issued Dec. 16, 2008 in International (PCT) Application No. PCT/JP2008/067230.
International Search Report issued Jun. 17, 2008 in International Application No. PCT/JP2008/058856.
Korean Decision to Grant a Patent issued Jan. 3, 2013 in corresponding Korean Patent Application No. 10-2010-7006181.
Canadian Decision to Grant a Patent issued Jan. 31, 2013 in corresponding Canadian Patent Application No. 2,700,615.
U.S. Notice of Allowance issued Feb. 22, 2013 in related U.S. Appl. No. 12/525,177.
Chinese Office Action (and English translation thereof) issued May 25, 2012 in corresponding Chinese Application No. 200880108704.3.
Communication under Rule 71(3) EPC (Intention to Grant) issued Jun. 26, 2012 in corresponding European Patent Application No. 08833183.0.
Notice of Allowance issued May 11, 2012 in U.S. Appl. No. 12/525,177.
European Search Report issued Jul. 12, 2013 in corresponding European Application No. 08752727.1.
Japanese Office Action issued Jul. 16, 2013 in corresponding Japanese Application No. 2011-029238, with English translation.
Chinese Office Action (and English translation) issued Aug. 12, 2013 in corresponding Chinese Application No. 200880108704.3.
Lin, Zai-xing, "Damage and Failure Analysis of Advanced Composites in Commercial Airplane", (Xiamen Airlines, Xiamen 361006, China), Oct. 24, 2004.

* cited by examiner

MOLD CLOSED AFTER FASTENER IS INSERTED

PLASTIC INJECTED

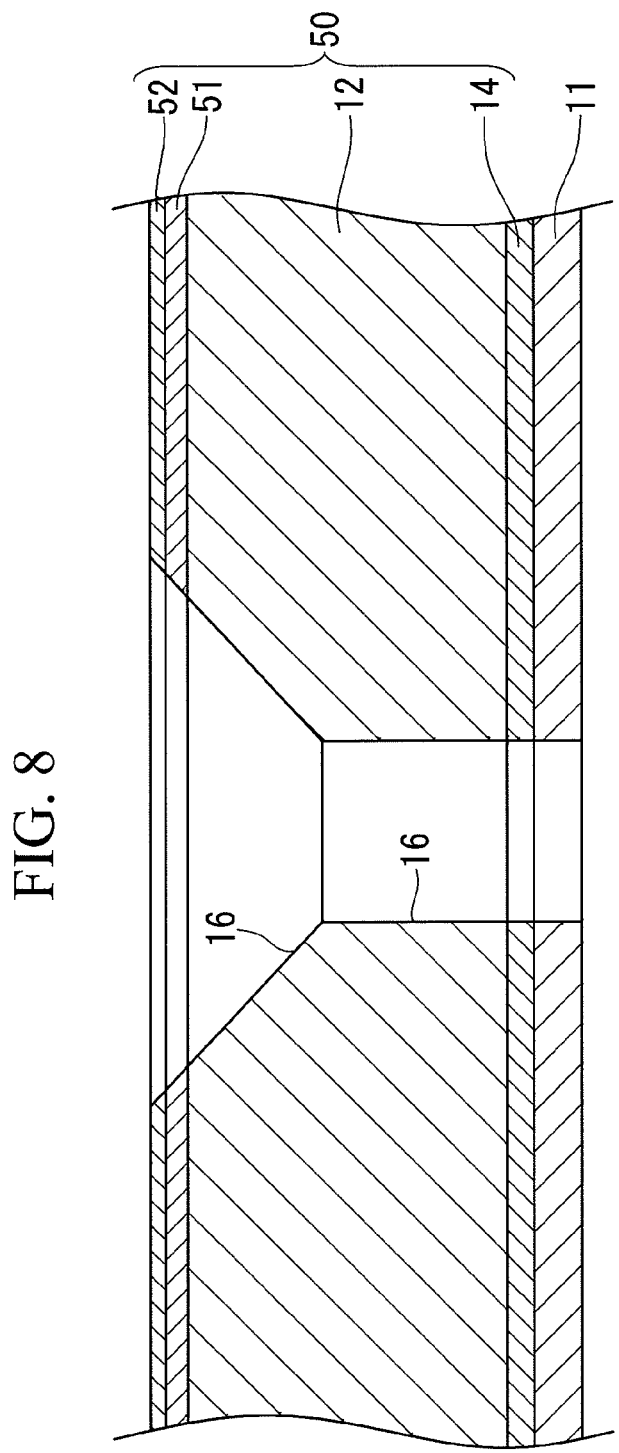

LIGHTNING-PROTECTION FASTENER

TECHNICAL FIELD

The present invention relates to a fastener, a lightning-protection type fastener in particular, used when employing conductive plastic material (for example, CFRP (carbon-fiber reinforced plastic)) as the skin of an aircraft.

BACKGROUND ART

A conventionally known fastener used when employing conductive plastic material as the skin of an aircraft has one end surface of a head portion covered with an insulating cap (for example, refer to Patent Document 1).

Patent Document 1: U.S. Pat. No. 4,630,168, Specification

SUMMARY OF INVENTION

However, the fastener disclosed in the aforementioned document has a problem in that the insulating cap can peel off (fall off) from the fastener head portion during operation of the aircraft.

The present invention has been conceived in the light of above-described situation, and an object thereof is to provide a lightning-protection fastener that is capable of reliably preventing peeling off of an insulating cap during operation of an aircraft and that is capable of improving the anti-lightning-strike capability of the fastener and the reliability thereof.

In order to solve the above-described problems, the present invention adopts the following solutions.

A lightning-protection fastener according to a first aspect of the present invention is a lightning-protection fastener that fastens a skin of an aircraft and a structural member positioned inside the skin, wherein an insulation layer is melt adhered so as to cover one end surface of a head portion and also is mechanically engaged with an engagement portion formed on the end surface.

With the lightning-protection fastener according to the first aspect, it is possible to reliably prevent peeling off (coming off) of the insulation layer 5 from the head portion 3 during operation of an aircraft and to continuously maintain the lightning-protection fastener 1 in a favorable condition, because, for example, as shown in FIGS. 1 and 2, the insulation layer is melt adhered (attached) to a fastener-side engagement portion of the head portion and the outer surface of the fastener-side engagement portion 7 and the inner surface of an insulation-layer-side engagement portion 8 are in close contact over the entirety thereof; and also because a convex portion 7a of the fastener-side engagement portion 7 and a concave portion 8a of the insulation-layer-side engagement portion 8, shown in FIGS. 1 and 2, are mechanically (geometrically) engaged with each other and a concave portion 7b of the fastener-side engagement portion 7 and a convex portion 8b of the insulation-layer-side engagement portion 8 are also mechanically (geometrically) engaged with each other, thereby bringing about a state in which the insulation layer 5 and the head portion 3 are mechanically secured (fixed).

In the above-described lightning-protection fastener, it is even more preferable that the insulation layer be formed by insert molding.

In such a lightning-protection fastener, for example, the insulation layer, formed of thermoplastic plastic or thermosetting plastic, is melt adhered (attached) to the fastener-side engagement portion of the head portion by insert molding (for example, injection molding, compression molding, and so forth), the outer surface of the fastener-side engagement portion 7 and the inner surface of the insulation-layer-side engagement portion 8 are, as shown in FIGS. 1 and 2, in close contact over the entirety thereof, and also the insulation layer 5 is firmly (reliably) fixed to the head portion 3 by the adhesive force of the insulation layer 5 itself; therefore, it is possible to more reliably fix (attach) the insulation layer 5 to the head portion 3 and to further improve the reliability of the lightning-protection fastener 1.

In addition, with such a lightning-protection fastener, because the insulation layer formed of, for example, thermoplastic plastic or thermosetting plastic is attached to the fastener-side engagement portion of the head portion by insert molding (for example, injection molding, compression molding and so forth), it is possible to realize mass production, thereby making it possible to reduce the manufacturing cost.

In the above-described lightning-protection fastener, it is even more preferable that a circumferential edge portion of the engagement portion have a round shape along a circumferential direction.

With a conventional flush head fastener, a circumferential edge portion of a flush head is processed like a sharp knife, and lightning usually selectively strikes the fastener because the electric field concentrates on the circumferential edge portion of the flush head causing a streamer during the precursor phase before a lightning strike. With such a lightning-protection fastener, however, because the circumferential edge portion of the fastener-side engagement portion formed on the head portion is formed so that the shape thereof in cross-sectional view is, for example, round, as shown in FIGS. 1 and 2 (for example, it is processed so as to have a radius (R) of about 0.1 mm to 0.3 mm), it is possible to prevent electric field concentration during the precursor phase immediately before a lightning strike, and thus a lightning strike on the lightning-protection fastener can be prevented, in addition to the anti-lightning-strike capability of the insulation layer.

In the above-described lightning-protection fastener, it is even more preferable that the insulation layer be formed so as to surround the circumferential edge portion of the engagement portion.

With such a lightning-protection fastener, a lightning strike on the lightning-strike protection fastener can be more reliably prevented because the top surface of the fastener-side engagement portion (that is, the top surface of the fastener head portion) and the outer circumferential surface of the fastener-side engagement portion are covered with the insulation layer.

In the above-described lightning-protection fastener, it is even more preferable that pre-processing for forming fine surface roughness be applied to at least a part of the surface of the engagement portion.

With such a lightning-protection fastener, it is possible to more reliably prevent peeling off (coming off) of the insulation layer from the head portion during operation of the aircraft and to continuously maintain the lightning-protection fastener in a favorable condition, because the contact properties between the surface of engagement portion and the insulation layer are further improved.

In the above-described lightning-protection fastener, it is even more preferable that the insulation layer be formed of material having superior contact properties with the surface of the engagement portion (for example, polyether-sulfone) (PES), thermosetting polyimide, etc.).

With such a lightning-protection fastener, it is possible to more reliably prevent peeling off (coming off) of the insulation layer from the head portion during the operation of the aircraft and to continuously maintain the lightning-protection fastener in a favorable condition, because the contact properties between the surface of engagement portion and the insulation layer are improved even further.

In the above-described lightning-protection fastener, it is preferable that the insulation layer have a first layer that covers the surface of the engagement portion and at least one layer that is a layer covering the first layer, for example, the first layer is formed by coating whereas the second layer is formed by insert molding or the first layer and the second layer are formed by two-step insert molding; it is even more preferable that the material for the first layer be one having superior contact properties with the surface of the engagement portion (for example, polyether-sulfone (PES), thermosetting polyimide, etc.).

With such a lightning-protection fastener, it is possible to more reliably prevent peeling off (coming off) of the insulation layer from the head portion during the operation of the aircraft and to continuously maintain the lightning-protection fastener in a favorable condition, because the contact properties between the surface of engagement portion and the insulation layer are improved even further.

A lightning-protection fastener according to a second aspect of the present invention is a lightning-protection fastener that fastens a skin of an aircraft and a structural member positioned inside the skin, wherein a circumferential edge portion of an engagement portion formed on one end surface of a head portion has a round shape along a circumferential direction.

With the lightning-protection fastener according to the second aspect, it is possible to reliably prevent peeling off (coming off) of the insulation layer 5 from the head portion 3 during the operation of an aircraft and to continuously maintain the lightning-protection fastener 1 in a favorable condition because, for example, the convex portion 7a of the fastener-side engagement portion 7 and the concave portion 8a of the insulation-layer-side engagement portion 8, shown in FIGS. 1 and 2, are mechanically engaged with each other, and the concave portion 7b of the fastener-side engagement portion 7 and the convex portion 8b of the insulation-layer-side engagement portion 8 are also mechanically engaged with each other, thereby bringing about a state in which the insulation layer 5 and the head portion 3 are secured (fixed).

An aircraft assembly according to a third aspect of the present invention is an aircraft assembly having a skin constituted of conductive plastic material as a main element, a structural member that supports the skin from inside, and a fastener that fastens the skin and the structural member, in which any of the above-described lightning-protection fasteners is provided as the fastener.

With the aircraft assembly according to the third aspect of the present invention, because the lightning strike current attempting to flow toward the fastener main body is blocked (reduced) by the insulation layer, sparks that occur at a fastener attachment portion due to the lightning strike current can be prevented.

In addition, because the lightning strike current attempting to flow toward the fastener main body is blocked (reduced) by the insulation layer, it is possible to entirely remove a DI (Dielectric Insulator: insulating plate), conventionally needed to prevent sparks between the structural member and the collar, as well as an insulating rubber cap attached so as to cover the tip portion of the male screw portion of the fastener and the entire collar (attached to prevent secondary discharge from the collar); therefore it is possible to significantly reduce the weight of the aircraft.

In the aircraft assembly described above, it is preferable that a gap between the lightning-protection fastener and the skin be filled with sealing material.

With such an aircraft assembly, it is possible to suppress the occurrence of a streamer, which is the precursor phase of a lightning strike, that occurs in the surrounding portion of the fastener flush head on which lightning strikes at a particularly high frequency due to the electric field concentration caused by the sharp edge; therefore, it is possible to suppress lightning strikes on the lightning-protection fastener.

In the aircraft assembly described above, it is preferable that the insulation layer be formed so as to enable formation of a gap between a hole bored through the skin and a surface of the insulation layer that opposes the hole.

With such an aircraft assembly, when the lightning-protection fastener is inserted into the hole formed on the skin and is attached thereto, it is possible to prevent the surface of the insulating layer (for example, the conical base surface when a taper is formed, as shown in FIGS. 1 and 2) from being pressed against the surface of the hole opposite thereto; therefore, it is possible to prevent damage (cracks) to the insulating layer.

In the aircraft assembly described above, it is preferable that a top surface of the insulation layer and a surface of the skin be processed to be flush with each other.

With such an aircraft assembly, if the insulation layer protrudes outward with respect to the surface of the skin when the lightning-protection fastener is inserted into the hole formed on the skin and is attached thereto, the surface of the insulation layer is removed so that the top surface of the insulation layer and the surface of the skin become flush with each other. Alternatively, the insulation layer is formed with a slightly greater thickness (for example, the necessary dimension+0.1 mm) in advance and is processed after assembly to make it flush with the skin surface. Thus, aerodynamic performance can be improved, and the fuel consumption can be reduced.

The lightning-protection fastener according to the present invention affords an advantage in that peeling off during operation of an aircraft can be reliably prevented and that reliability can be improved.

BRIEF DESCRIPTION OF DRAWINGS

FIG. 8 is a longitudinal-sectional view showing another embodiment of an aircraft assembly to which the lightning-protection fastener according to the present invention can be applied.

DETAILED DESCRIPTION OF THE INVENTION

A first embodiment of a lightning-protection fastener (Fastener) according to the present invention will be described below, referring to FIGS. 1 and 2.

Figure 1:
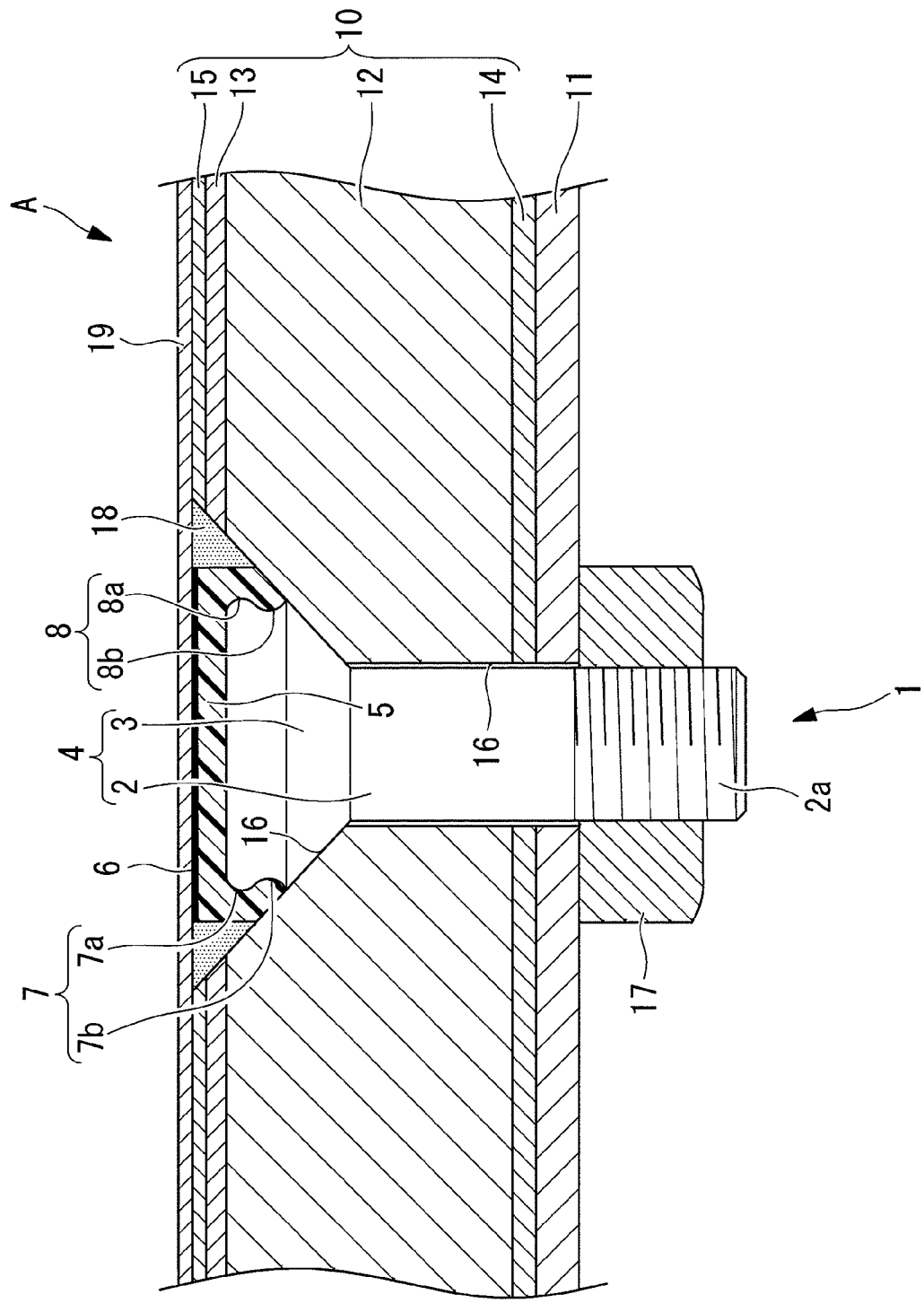
FIG. 1 is a cross-sectional view of an aircraft assembly showing a state in which a skin and a structural member are fastened by a lightning-protection fastener according to a first embodiment of the present invention.
Figure 2:
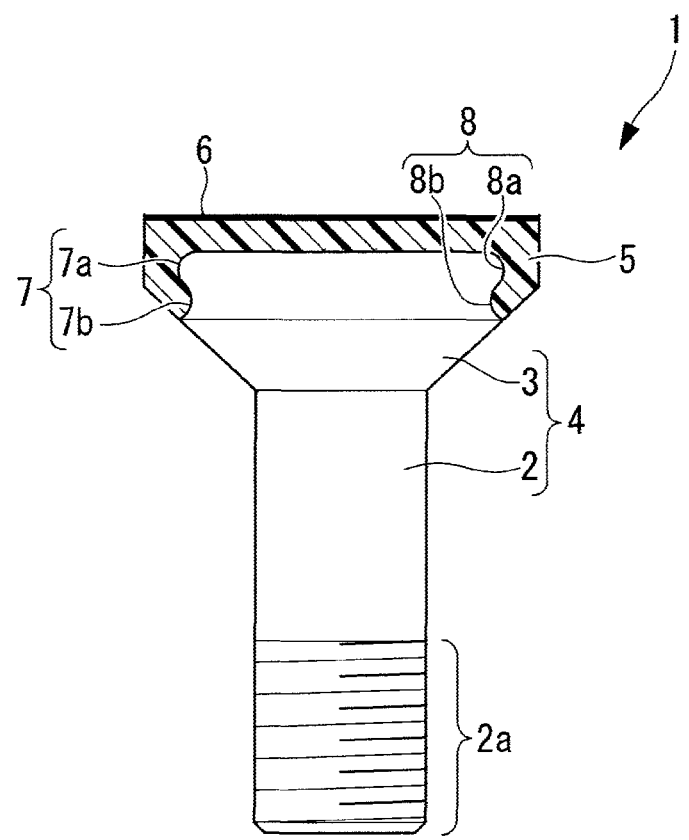
FIG. 2 is a front elevation of the lightning-protection fastener according to the first embodiment of the present invention.

As shown in FIGS. 1 and 2, a lightning-protection fastener (a fastener of the lightning-protection type) 1 according to this embodiment is constituted mainly of a cylindrical rod-shaped shaft portion (Shank) 2, a fastener main body 4 having a substantially truncated-cone shaped head portion (Flush Head) 3 that is provided at one end of the shaft portion 2 and whose diameter increases with increasing distance from the shaft portion 2, an insulation layer 5 disposed so as to cover one end portion (the top portion located on the top side in FIGS. 1 and 2) of the head portion 3, and a conductive layer 6 disposed so as to cover one end surface (the end surface on the top side in FIGS. 1 and 2) of the insulation layer 5.

The fastener main body 4 is formed integrally of the shaft portion 2 and the head portion 3 and is manufactured using, for example, alloys such as titanium alloy (Ti-6Al-4V: annealed material) and Inconel.

A male screw portion 2a that is threaded to a female screw portion of a collar (nut), described later, is provided (formed) on the other end portion (the end portion on the bottom side in FIGS. 1 and 2) of the shaft portion 2.

A fastener-side engagement portion (engagement portion) 7, to which the insulation layer 5 is secured, is provided (formed) on one end portion (top portion) of the head portion 3. The fastener-side engagement portion 7 is located on the opposite side from the shaft portion 2 (the top side in FIGS. 1 and 2) and is provided with a convex portion 7a that protrudes (increases in diameter) radially outward around the circumferential direction and a concave portion 7b that connects (joins) the shaft portion 2 and the convex portion 7a and that is depressed (dented) radially inward around the circumferential direction. The convex portion 7a and the concave portion 7b are respectively formed so that the shapes thereof in a cross-sectional view are round, as shown in FIGS. 1 and 2 (for example, they are processed so as to have a radius (R) of about 0.1 mm to 0.3 mm).

Note that the diameter at one end surface of the head portion 3 is, for example, about 6 mm.

The insulation layer 5 is a disk-like member manufactured using, for example, thermoplastic plastic (for example, polyether-imide (PEI) having heat resistance and strength and, additionally, a high dielectric breakdown voltage, polyether-ether-ketone (PEEK) having superior heat resistance and strength and, additionally, superior formability and versatility, polyphenylsulfide (PPS) having heat resistance and strength and, additionally, superior formability and versatility, and polyamide-imide (PAI) having particularly superior heat resistance and strength); or thermosetting plastic (for example, polyimide (PI) having particularly superior heat resistance and strength). An insulation-layer-side engagement portion 8, which is secured to the fastener-side engagement portion 7, is provided (formed) on a circumferential edge portion (the end portion on the bottom side in FIGS. 1 and 2) of the insulation layer 5. The insulation-layer-side engagement portion 8 is provided with a concave portion 8a that is depressed (dented) radially inward around the circumferential direction and that couples with the convex portion 7a of the fastener-side engagement portion 7 and a convex portion 8b that protrudes (increases in diameter) radially outward around the circumferential direction and that couples with the concave portion 7b of the fastener-side engagement portion 7.

In addition, the insulation layer 5 is formed by injection molding so as to be attached to the fastener-side engagement portion 7 of the head portion 3. Thus, outer surfaces of the fastener-side engagement portion 7 (in more detail, a top surface (flat surface) of the fastener-side engagement portion 7, a side surface (outer-circumferential surface) of the convex portion 7a, and a side surface (outer-circumferential surface) of the concave portion 7b) and inner surfaces of the insulation-layer-side engagement portion 8 (in more detail, a bottom surface (the flat surface located on the bottom side in FIGS. 1 and 2) of the insulation-layer-side engagement portion 8, a side surface (inner-circumferential surface) of the concave portion 8a, and a side surface (inner-circumferential surface) of the convex portion 8b) are in close contact over the entirety thereof; therefore, the insulation layer 5 is firmly (reliably) fixed to the head portion 3 by the adhesive force of the insulation layer 5 itself.

Note that it is preferable to make the plate thickness of the insulation layer 5 (the length between the top surface (the flat surface located on the top side in FIGS. 1 and 2) and the bottom surface (the flat surface located on the bottom side in FIGS. 1 and 2)), for example, about 0.6 mm to 1.0 mm, so as to provide sufficient dielectric strength even against the MIL-STD-1757A zone 1 lightning-strike test voltage (about 40 kV).

The conductive layer 6 is, for example, a disk-like member formed of copper foil, having an outer diameter that is substantially equal in dimension to the outer diameter of the insulation layer 5, and is fixed (bonded) to the top surface of the insulation layer 5 with, for example, adhesive.

Note that the conductive layer 6 is not an essential element and can be omitted depending on the required level of reliability.

The thus-manufactured lightning-protection fastener 1 is used to, for example, fasten a skin 10 of an aircraft and a structural member (for example, a rib, a stringer, and so forth) 11, as shown in FIG. 1. Note that the skin 10 and the structural member 11 are fastened by the lightning-protection fastener 1, thereby forming an aircraft assembly (for example, a main wing assembly, a tail wing assembly, a fuselage assembly, and so forth) A.

The skin 10 is made mainly of plastic material (for example, CFRP (carbon-fiber reinforced plastic), referred to as "CFRP" hereafter) 12 having conductivity (conductivity of about 1/100 to 1/1000 that of aluminum), whose entire front surface (the surface located on the outside after assembly) and entire back surface (the surface located inside after assembly) are laminated with plastic materials having an insulating property (for example, GFRP (glass-fiber cured plastic), referred to as "GFRP" hereafter) 13 and 14.

Additionally, the front surface (the surface located on the outside after assembly) of the GFRP 13, located on the front surface side of the CFRP 12, is laminated with a mesh-like (or plate-like) member (for example, copper, referred to as "conductive mesh" or "conductive member" hereafter) 15 the entirety of which is conductive.

The structural member 11 is made of, for example, aluminum alloy, titanium material, or CFRP (carbon-fiber reinforced plastic) and is disposed at a predetermined location on the back surface (the surface located on the inside after assembly) of the GFRP 14.

Concave sites (holes) 16 that penetrate the skin 10 and the structure member 11 in a plate-thickness direction and that are capable of receiving the lightning-protection fastener 1 are bored through at predetermined locations of a structure having the structural member 11 disposed on the back surface of the GFRP 14. Then, the lightning-protection fastener 1 is accommodated in each concave site 16, and a collar (nut) 17 manufactured using, for example, alloys such as titanium alloy and Inconel, is fastened to the male screw portion 2a protruding inward from the back surface of the structural member 11.

Note that, in FIG. 1, reference numeral 18 is a sealing material (for example, polysulfide polymer of specification AMS 3281, made by PRC-Desoto, item number PR1776M B2) that fills a gap between the lightning-protection fastener 1 and the concave site 16, and the reference numeral 19 is aluminum tape fixed with adhesive (bonded) on the surface (in more detail, the surface of the conductive layer 6) of the lightning-protection fastener 1 and the surface of the conductive mesh 15.

In addition, the aluminum tape 19 is not an essential element and can be omitted depending on the required level of reliability.

With the lightning-protection fastener 1 according to this embodiment, the convex portion 7a of the fastener-side engagement portion 7 and the concave portion 8a of the insulation-layer-side engagement portion 8 mechanically engage with each other, and the concave portion 7b of the fastener-side engagement portion 7 and the convex portion 8b of the insulation-layer-side engagement portion 8 mechanically engage with each other, thereby bringing about a state in which the insulation layer 5 is mechanically secured (fixed) to the head portion 3. Therefore, it is possible to reliably prevent the insulation layer 5 from peeling off (coming off) from the head portion 3 during operation of the aircraft and to continuously maintain the lightning-protection fastener 1 in a favorable condition.

Additionally, with the lightning-protection fastener 1 according to this embodiment, the insulation layer 5 formed of thermoplastic plastic or thermosetting plastic is attached to the fastener-side engagement portion 7 of the head portion 3 by injection molding, the outer surface of the fastener-side engagement portion 7 and the inner surface of the insulation-layer-side engagement portion 8 are in close contact over the entirety thereof, and the insulation layer 5 is firmly (reliably) fixed to the head portion 3 by the adhesive force of the insulation layer 5 itself. Therefore, it is possible to reliably fix (attach) the insulation layer 5 to the head portion 3 and to further improve the reliability of the lightning-protection fastener 1.

Further, with the lightning-protection fastener 1 according to this embodiment, the convex portion 7a is formed so that the shape thereof in a cross-sectional view is round, as shown in FIGS. 1 and 2 (for example, it is processed so as to have a radius (R) of about 0.1 mm to 0.3 mm). Therefore, it is possible to prevent a lightning strike on the lightning-protection fastener 1 by alleviating electric field concentration thereon before a lightning strike, thus improving the lightning protection performance.

Furthermore, with the lightning-protection fastener 1 according to this embodiment, because the insulation layer 5 formed of thermoplastic plastic or thermosetting plastic is attached to the fastener-side engagement portion 7 of the head portion 3 by injection molding, it is possible to realize mass production, thereby making it possible to reduce the manufacturing cost.

Additionally, because the insulation layer 5 is disposed between the conductive layer 6 and the fastener main body 4, even if lightning directly strikes the conductive layer 6, it is possible to block (reduce) lightning strike current attempting to flow from the conductive layer 6 to the fastener main body 4.

Further, when the lightning-protection fastener 1 according to this embodiment is used to, for example, fasten the skin 10 of the aircraft and the structural member (for example, a rib, a stringer, and so forth) 11, as shown in FIG. 1, because the lightning strike current attempting to flow from the conductive layer 6 to the fastener main body 4 is blocked (reduced) by the insulation layer 5, the injection of the lightning strike current into the CFRP 12 can be prevented; therefore, it is possible to prevent the CFRP 12 from being damaged by the lightning strike current.

Additionally, when the lightning-protection fastener 1 according to this embodiment is used to, for example, fasten the skin 10 of the aircraft and the structural member (for example, a rib, a stringer, and so forth) 11, as shown in FIG. 1, because the lightning strike current is prevented from flowing (made difficult to flow) toward the fastener main body 4, it is possible to entirely remove a DI (Dielectric Insulator), conventionally needed to prevent sparks between the structure 11 and the collar 17, as well as an insulating rubber cap attached so as to cover the tip portion of the male screw portion 2a and the entire collar 17 (attached to prevent secondary discharge from the collar 17); therefore, it is possible to significantly reduce the weight of the aircraft.

Note that when the lightning-protection fastener 1 according to this embodiment is used to, for example, fasten the skin 10 of the aircraft and the structural member 11, as shown in FIG. 1, it is more preferable that the insulation layer 5 be formed so that a gap 39 can be formed between a tapered surface of the insulation layer 5 (a surface opposing a tapered surface of the concave site 16) and the concave site 16 bored through the skin 10 (in more detail, a tapered surface of the concave site 16).

Accordingly, when the lightning-protection fastener 1 is inserted into the concave site 16 formed on the skin 10 and is attached thereto, it is possible to prevent the tapered surface of the insulation layer 5 from being pressed against the surface (tapered surface) of the concave site 16, and therefore, it is possible to prevent damage (cracks) to the insulation layer.

Figure 3A:
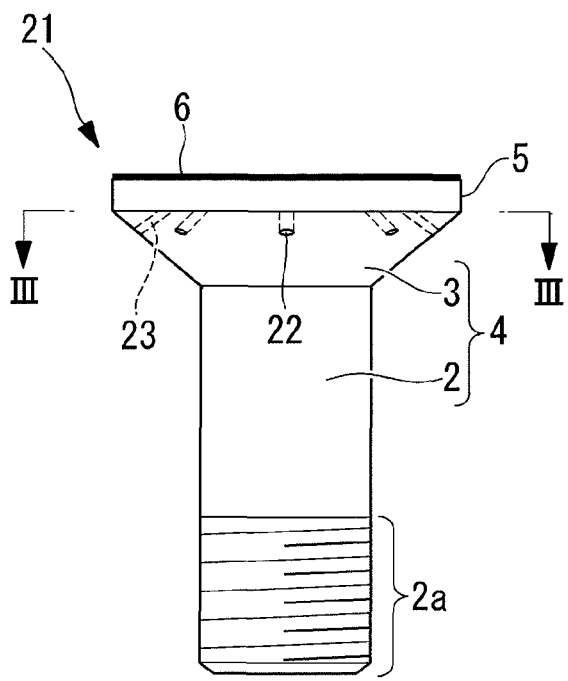
FIG. 3A is a front elevation of a lightning-protection fastener according to a second embodiment of the present invention.
Figure 3B:
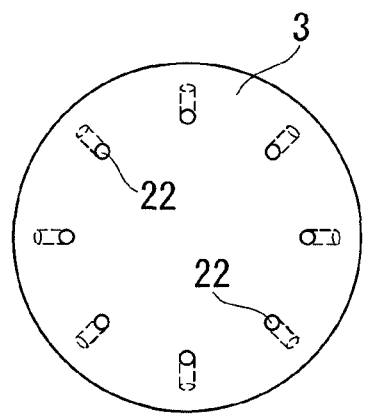
FIG. 3B is a cross-sectional view of FIG. 3A taken along arrows III-III.

A second embodiment of a lightning-protection fastener according to the present invention will now be described using FIGS. 3A and 3B.

A lightning-protection fastener 21 according to this embodiment differs from that in the first embodiment described above in that engagement portions 22 and 23 are provided instead of the engagement portions 7 and 8 described above. Because other components are the same as those in the first embodiment described above, descriptions of those components are omitted herein.

Note that the identical reference numerals are given to the members identical to those of the first embodiment described above.

Fastener-side engagement portions (engagement portions) 22, to which the insulation layer 5 is secured, are provided (formed) on one end portion (top portion) of the head portion 3. The fastener-side engagement portions 22 are a plurality (eight in this embodiment) of through-holes penetrating in the plate-thickness direction and are disposed along the circumferential edge portion of the head portion 3. In addition, as shown in FIGS. 3A and 3B, each through-hole extends radially from the top surface (the flat surface located on the top side in FIG. 3A) of the head portion 3 toward the shaft portion 2 side, that is, so that opening ends located on the top surface of the head portion 3 are located radially inward of opening ends located on the side surface of the head portion 3.

As for the circumferential edge portion of the fastener head portion, it is more preferable that it be formed so that the shape thereof in cross-sectional view is round (processed so as to have a radius (R)).

Insulation-layer-side engagement portions 23, which are secured to the fastener-side engagement portions 22, are provided (formed) on the bottom surface (the flat surface located on the bottom side in FIG. 3A) of the insulation layer 5. The insulation-layer-side engagement portions 23 are a plurality (eight in this embodiment) of circular rod-like protrusions (convex portions) that couple to the fastener-side engagement portions 22 and are disposed around the circumferential edge portion. Note that, because the insulation layer 5 is attached to the head portion 3 by injection molding, the insulation-layer-side engagement portions 23 are molded (formed) at the time of the injection molding so as to enter the fastener-side engagement portions 22. Then, by having the insulation layer 5 attached to the head portion 3 by injection molding, the surface of the insulation layer 5 (in more detail, the bottom surface of the insulation layer 5 and the outer circumferential surface of the insulation-layer-side engagement portions 23) and the surface of the head portion 3 (in more detail, the top surface of the head portion 3 and the inner circumferential surface of the fastener-side engagement portions 22) are in close contact over the entirety thereof; therefore, the insulation layer 5 is firmly (reliably) fixed to the head portion 3 by the adhesive force of the insulation layer 5 itself.

With the lightning-protection fastener 21 according to this embodiment, the fastener-side engagement portions 22 and the insulation-layer-side engagement portions 23 mechanically engage with each other, thereby bringing about a state in which the insulation layer 5 is mechanically secured (fixed) to the head portion 3. Therefore, it is possible to reliably prevent the insulation layer 5 from peeling off (coming off) from the head portion 3 during operation of the aircraft and to continuously maintain the lightning-protection fastener 21 in a favorable condition.

Additionally, in the lightning-protection fastener 21 according to this embodiment, the insulation layer 5 formed of thermoplastic plastic or thermosetting plastic is attached to the head portion 3 by injection molding, the surface of the insulation layer 5 and the surface of the head portion 3 are in close contact over the entirety thereof, and the insulation layer 5 is firmly (reliably) fixed to the head portion 3 by the adhesive force of the insulation layer 5 itself. Therefore, it is possible to reliably fix (attach) the insulation layer 5 to the head portion 3 and to further improve the reliability of the lightning-protection fastener 21.

Furthermore, with the lightning-protection fastener 21 according to this embodiment, because the insulation layer 5 formed of thermoplastic plastic or thermosetting plastic is attached to the head portion 3 by injection molding, it is possible to realize mass production, thereby making it possible to reduce the manufacturing cost.

Additionally, because the insulation layer 5 is disposed between the conductive layer 6 and the fastener main body 4, even if lightning directly strikes the conductive layer 6, it is possible to block (reduce) lightning strike current attempting to flow from the conductive layer 6 to the fastener main body 4.

Further, when the lightning-protection fastener 21 according to this embodiment is used to, for example, fasten the skin 10 of the aircraft and the structural member (for example, a rib, a stringer, and so forth) 11, as shown in FIG. 1, because the lightning strike current attempting to flow from the conductive layer 6 to the fastener main body 4 is blocked (reduced) by the insulation layer 5, the injection of the lightning strike current into the CFRP 12 can be prevented.

Additionally, when the lightning-protection fastener 21 according to this embodiment is used to, for example, fasten the skin 10 of the aircraft and the structural member (for example, a rib, a stringer, and so forth) 11, as shown in FIG. 1, because the lightning strike current is prevented from flowing (made difficult to flow) toward the fastener main body 4, it is possible to entirely remove a DI (Dielectric Insulator), conventionally needed to prevent sparks between the structure 11 and the collar 17, as well as an insulating rubber cap attached so as to cover the tip portion of the male screw portion 2a and the entire collar 17 (attached to prevent secondary discharge from the collar 17); therefore, it is possible to significantly reduce the weight of the aircraft.

A third embodiment of a lightning-protection fastener according to the present invention will now be described using FIGS. 4A to 6C.

The lightning-protection fastener 31 according to this embodiment differs from those of the embodiments described above in that engagement portions 32 and 33 are provided instead of the engagement portions 7, 8, 22, and 23 described above. Because other components are the same as those in the embodiments described above, descriptions of those components are omitted herein.

Note that the identical reference numerals are given to the members identical to those of the embodiments described above.

A fastener-side engagement portion (engagement portion) 32, to which the insulation layer 5 is secured, is provided (formed) on the top surface of the head portion 3. The fastener-side engagement portion 32 is provided with a first convex portion 34 having a circular shape in plan view and positioned in the central portion thereof and a second convex portion 35 having a circular shape in plan view and positioned in the circumferential edge portion. The heights of the first convex portion 34 and the second convex portion 35 (the lengths in the vertical direction in FIG. 4A) are set from 0.2 mm to 0.4 mm; dovetails 36 are formed, respectively, on side surfaces (outer circumferential surfaces) of the first convex portion 34 and the second convex portion 35. In addition, it is more preferable that circumferential edge portions of the first convex portion 34 and the second convex portion 35 and the circumferential edge portion of the fastener head portion 3 be respectively formed so that the shapes thereof in cross-sectional view are round (processed so as to have a radius (R)).

Figure 4A:
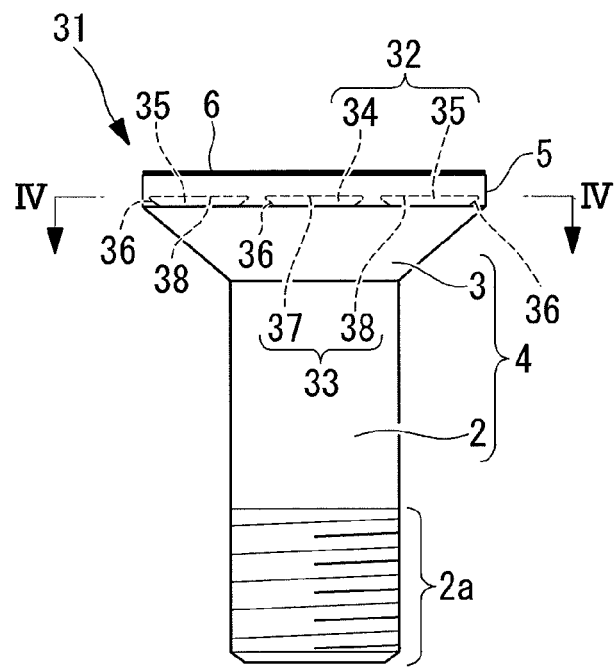
FIG. 4A is a front elevation of a lightning-protection fastener according to a third embodiment of the present invention.
Figure 4B:
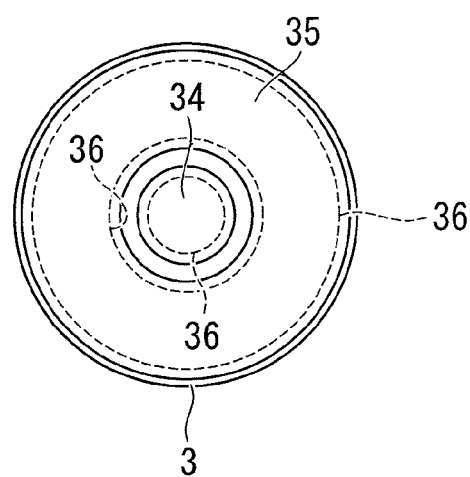
FIG. 4B is a cross-sectional view of FIG. 4A taken along arrows IV-IV.

An insulation-layer-side engagement portion 33, which is secured to the fastener-side engagement portion 32, is provided (formed) on the bottom surface of the insulation layer 5 (the flat surface positioned on the bottom side in FIG. 4A). The insulation-layer-side engagement portion 33 is provided with a first concave portion 37 that is disposed in the center thereof and couples to the first convex portion 34 and a second concave portion 38 that is disposed along the circumferential edge portion thereof and couples to the second convex portion 35. Note that because the insulation layer 5 is attached to the head portion 3 by injection molding, the insulation layer 5 is molded (formed) at the time of injection molding so as to enter the dovetails 36 without a gap. Then, by having the insulation layer 5 attached to the head portion 3 by injection molding, outer surfaces of the fastener-side engagement portion 32 (in more detail, the top surface of the first convex portion 34, the side surface of the first convex portion 34, the top surface of the second convex portion 35, and the side surface of the second convex portion 35) and inner surfaces of the insulation-layer-side engagement portion 33 (in more detail, the bottom surface of the first concave portion 37, the inner circumferential surface of the first concave portion 37, the bottom surface of the second concave portion 38, and the inner circumferential surface of the second concave portion 38) are in close contact over the entirety thereof; therefore, the insulation layer 5 is firmly (reliably) fixed to the head portion 3 by the adhesive force of the insulation layer 5 itself.

With the lightning-protection fastener 31 according to this embodiment, the fastener-side engagement portion 32 and the insulation-layer-side engagement portion 33 mechanically engage with each other, thereby bringing about a state in which the insulation layer 5 is mechanically secured (fixed) to the head portion 3. Therefore, it is possible to reliably prevent the insulation layer 5 from peeling off (coming off) from the head portion 3 during operation of the aircraft and to continuously maintain the lightning-protection fastener 31 in a favorable condition.

Additionally, with the lightning-protection fastener 31 according to this embodiment, the insulation layer 5 formed of thermoplastic plastic or thermosetting plastic is attached to the head portion 3 by injection molding, the surfaces of the insulation layer 5 and the surface of the head portion 3 are in close contact over the entirety thereof, and the insulation layer 5 is firmly (reliably) fixed to the head portion 3 by the adhesive force of the insulation layer 5 itself; therefore, it is possible to reliably fix (attach) the insulation layer 5 to the head portion 3 and to further improve the reliability of the lightning-protection fastener 31.

Furthermore, with the lightning-protection fastener 31 according to this embodiment, because the insulation layer 5 formed of thermoplastic plastic or thermosetting plastic is attached to the head portion 3 by injection molding, it is possible to realize mass production, thereby making it possible to reduce the manufacturing cost.

Additionally, because the insulation layer 5 is disposed between the conductive layer 6 and the fastener main body 4, even if lightning directly strikes the conductive layer 6, it is possible to block (reduce) lightning strike current attempting to flow from the conductive layer 6 to the fastener main body 4.

Further, when the lightning-protection fastener 31 according to this embodiment is used to, for example, fasten the skin 10 of the aircraft and the structural member (for example, a rib, a stringer, and so forth) 11, as shown in FIG. 1, because the lightning strike current attempting to flow from the conductive layer 6 to the fastener main body 4 is blocked (reduced) by the insulation layer 5, the introduction of the lightning strike current into the CFRP 12 can be prevented.

Additionally, when the lightning-protection fastener 31 according to this embodiment is used to, for example, fasten the skin 10 of the aircraft and the structural member (for example, a rib, a stringer, and so forth) 11, as shown in FIG. 1, because the lightning strike current is prevented from flowing (made difficult to flow) toward the fastener main body 4, it is possible to entirely remove a DI (Dielectric Insulator), conventionally needed to prevent sparks between the structure 11 and the collar 17, as well as an insulating rubber cap attached so as to cover the tip portion of the male screw portion 2a and the entire collar 17 (attached to prevent secondary discharge from the collar 17); therefore, it is possible to significantly reduce the weight of the aircraft.

Next, one example of a manufacturing method of the above-described lightning-protection fasteners 1, 21, and 31 will be described using FIG. 5 and FIGS. 6A to 6C.

Figure 6A:
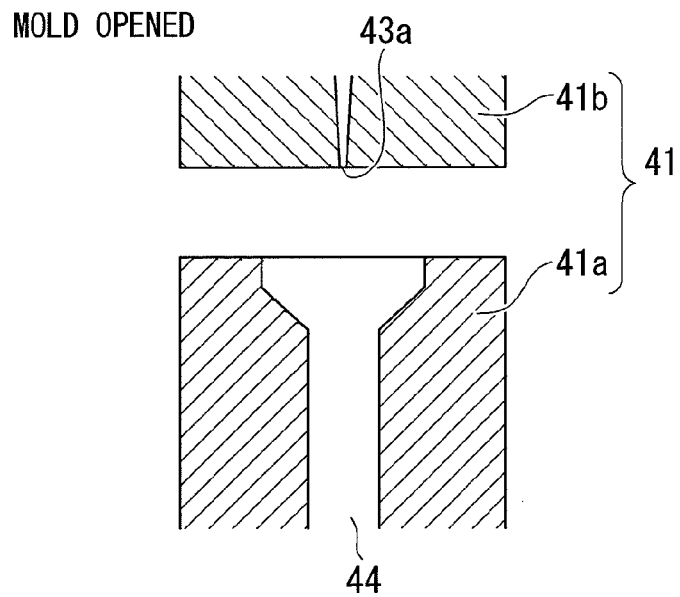
FIG. 6A is an explanatory diagram for explaining a manufacturing method of the lightning-protection fastener according to the present invention.
Figure 6B:
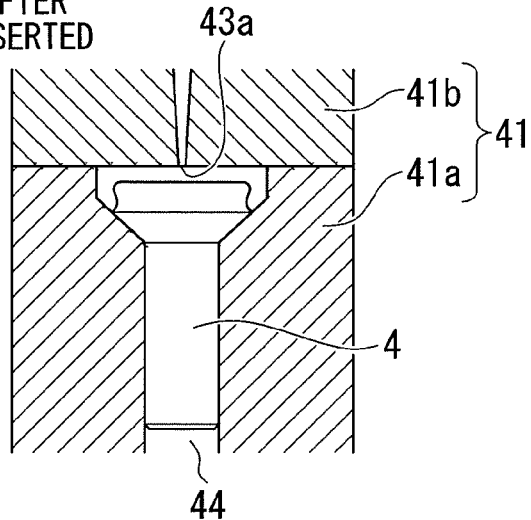
FIG. 6B is an explanatory diagram for explaining the manufacturing method of the lightning-protection fastener according to the present invention.
Figure 6C:
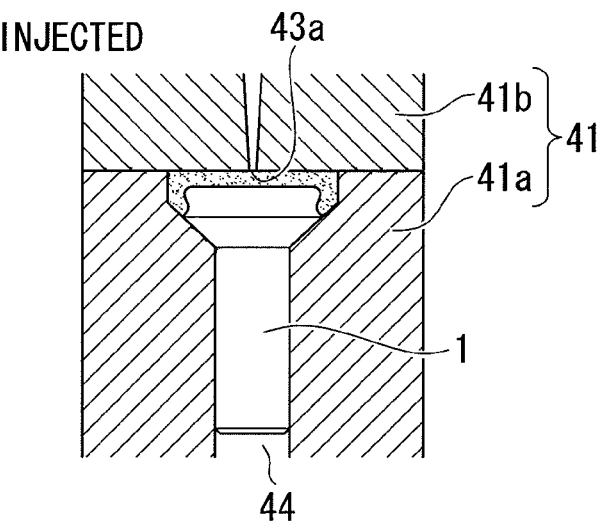
FIG. 6C is an explanatory diagram for explaining the manufacturing method of the lightning-protection fastener according to the present invention.

Note that FIGS. 6A to 6C are explanatory diagrams based on the shape of the lightning-protection fastener 1, and they are similarly applicable to the lightning-protection fasteners 21 and 31.

(1) The fastener main body 4 in which the male screw portion 2a is provided on the other end portion of the shaft portion 2 is prepared, and the fastener-side engagement portion 7, in the case of the lightning-protection fastener 1, a plurality of the fastener-side engagement portions 22, in the case of the lightning-protection fastener 21, and the fastener-side engagement portion 32, in the case of the lightning-protection fastener 31 are processed on the head portion 3.

Figure 5:
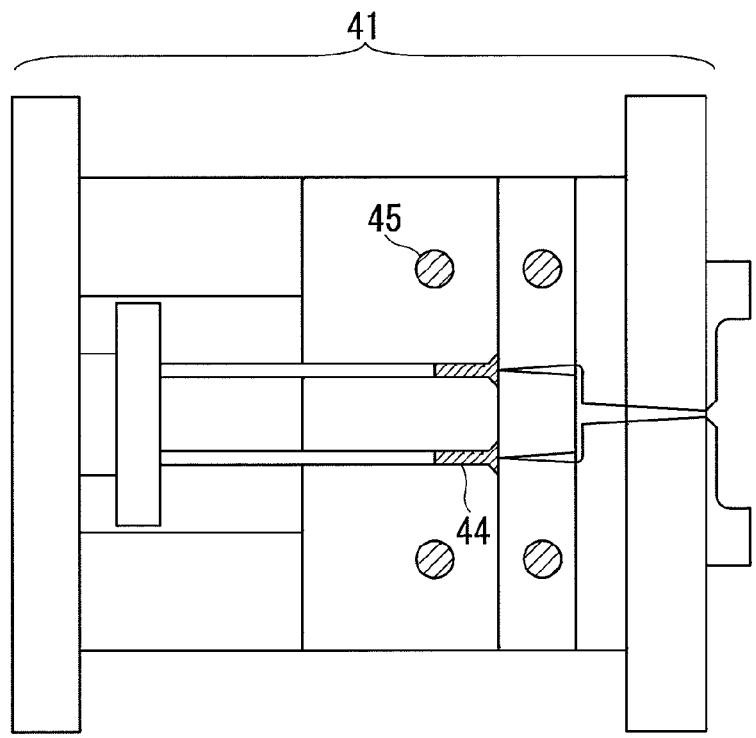
FIG. 5 is a plan view of a metal cast mold for insert molding used for manufacturing the lightning-protection fastener according to the present invention.

(2) Next, the lightning-protection fastener 1 having the insulation layer 5 is molded using a vertical injection molding machine (not shown) with a mold clamping force of 30 tons and a mold 41 for insert molding with a production quantity of four pieces (see FIG. 5). Thermoplastic polyimide (referred to as "plastic" hereafter) is used as the material for the insulation layer 5, and the cylinder temperature is set to 380° C. In addition, the mold temperature is adjusted to 180° C. by a cartridge heater 45 (see FIG. 5) built into the mold.

(3) The mold 41 is attached to a platen of the injection machine in advance, and a lid member 41b of the mold 41 is opened (see FIG. 6A). The fastener main body 4 with the processed head portion 3 is inserted into the hole portion 44, formed in the main body 41a of the mold 41, that receives the lightning-protection fastener. If the fastener main body 4 is preheated to the mold temperature or a temperature in the vicinity thereof at this time, superior contact properties between the plastic and the fastener main body 4, as well as good fluidity of the plastic, are obtained.

(4) The lid member 41b of the mold is closed (see FIG. 6b), a predetermined mold clamping force is applied, and then injection filling of plastic is carried out from a plastic injection point (gate) 43a provided near the head portion 3, thus forming the insulation layer 5 on the head portion 3. The injection point 43a is pin-gate shaped and is located near the center of the head portion 3. By providing the plastic injection point 43a perpendicular to the plane of the head portion 3, the fastener main body 4 is pressed against the main body 41a of the mold 41 by plastic pressure generated with injection filling of plastic. Accordingly, the gap between the inclined surface of the head portion 3 and the corresponding inclined surface of the main body 41a of the mold 41 is reduced, and thus the occurrence of burrs is prevented.

(5) After injection is completed, holding pressure is applied for a predetermined period to prevent sink mark formation while cooling for a set amount of time; then the lid member 41b of the mold is opened, and the lightning-protection fastener 1 having the insulation layer 5 on the head portion 3 is taken out.

(6) The removed lightning-protection fastener 1 is left to cool for a set amount of time; then if necessary, a gate mark on the molded product is post-processed using a nipper, sandpaper, a cutter or the like to complete it. However, the processing method for the gate mark is not limited to these methods.

In addition, for the purpose of eliminating residual stress at the time of molding, the lightning-protection fastener 1 having the insulating layer is subjected to annealing as needed, using a heating furnace or the like.

Note that because the plastic pressure generated with injection filling of plastic is high, for example, about 100 MPa, a void (void) is unlikely to occur between the insulation layer 5 and the head portion 3, and thus contact properties between the insulation layer 5 and the head portion 3 can be improved.

In addition, as pre-processing for the above-described injection molding, for the purpose of improving contact properties between the fastener main body 4 and the plastic insulating layer, pre-processing may be applied to the surface of the head portion 3 wherein fine surface roughness are formed on the surface of the head portion 3 by surface processing such as atmospheric-pressure plasma irradiation, etc. As the pre-processing method, for instance, the following concrete example can be given.

(1) When irradiating with atmospheric-pressure plasma, air (oxygen, nitrogen, or gas containing these) is used as source gas, and the processing is applied for 20 seconds under the conditions where flow rate=10 sccm, pressure=atmospheric pressure, and direct current torch (not shown) (alternatively, RF torch, microwave torch or vacuum torch may be used) is set to 40 W.

(2) When performing pre-processing for roughening the surface of the head portion 3 by blasting the surface of the head portion 3 with blasting particles, for example, hard particles such as metal, ceramic, glass, and so forth (such processing is generally known as shot blasting), it is carried out with the following conditions: pressure=400 kPa, grit used is made of alumina with grit #60, irradiation time=10 sec/20 pieces, distance between nozzle and specimen=100 mm, surface roughness after fabrication Ra=1.6 μm, and coverage=100%.

(3) Anodic oxidation coating is applied to the surface of the head portion 3.

(4) As alternative methods for roughening the surface of the head portion 3, polishing marks, knurling, and so forth can be used; chemical etching can also be used.

In addition, priming may be applied to the fastener head portion in order to improve the contact properties of melt adhered portions of the fastener head portion and the insulator. For example, by coating the fastener head portion with polyether-sulfone (PES), the contact properties between the polyimide and the fastener main body 4 can be improved by about three fold.

Alternatively, the contact properties between the insulation layer and the fastener head portion can be improved by making the first insulation layer melt adhered to the fastener head portion using plastic with better contact properties as compared to the insulation layer formed thereon. For example, a lightning-protection fastener having high contact as well as high insulation can be made by using an elastomer with high contact properties as the first insulation layer and by having polyimide, whose withstand voltage is high, molded thereon.

As a manufacturing method, for example, two-color injection molding of elastomer and polyimide can be used. Using elastic insulator, such as elastomer, as the first insulation layer, not only improves contact properties but can also bring about an effect of suppressing failures at the engagement portions by alleviating stress on the mechanical engagement portions.

Next, an installation method when the manufactured lightning-protection fastener 31 is used to, for example, fasten the skin 10 of the aircraft and the structural member (for example, a rib, a stringer, and so forth) 11 will be described using FIGS. 7A to 7D.

Note that FIGS. 7A to 7D are explanatory diagrams based on the shape of the lightning-protection fastener 31, and they are similarly applicable to the lightning-protection fasteners 1 and 21.

(1) After the skin 10 of an aircraft and structural member 11 are overlaid, the concave site (hole) 16 is bored at a predetermined location (see FIG. 7A) using a boring tool (machine) such as a drill.

Figure 7A:
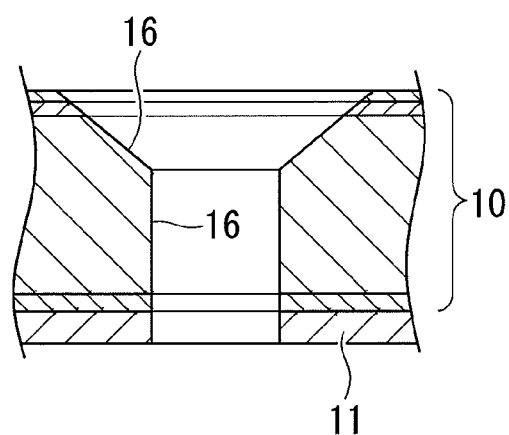
FIG. 7A is an explanatory diagram for explaining an installation method when the lightning-protection fastener according to the present invention is used to fasten a skin of an aircraft and a structural member.
Figure 7B:
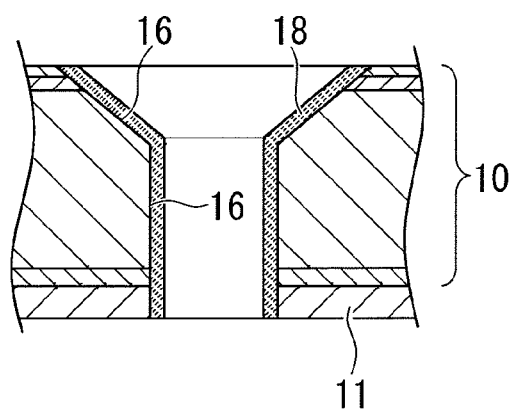
FIG. 7B is an explanatory diagram for explaining the installation method when the lightning-protection fastener according to the present invention is used to fasten the skin of the aircraft and the structural member.

(2) The inner surface (inner circumferential surface) of the concave site 16 is coated with the sealing material 18 (see FIG. 7B).

Figure 7C:
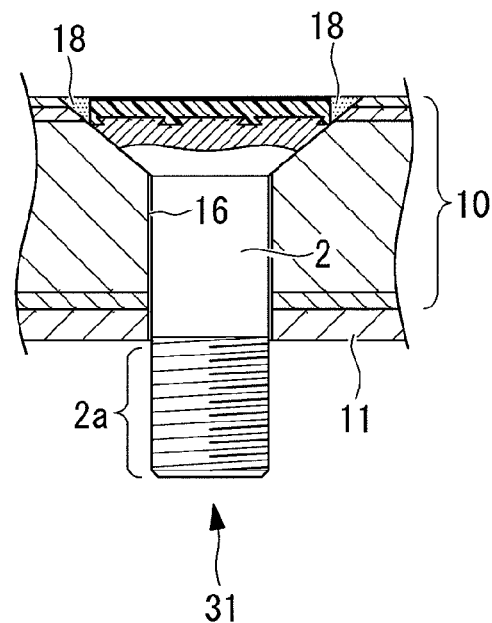
FIG. 7C is an explanatory diagram for explaining the installation method when the lightning-protection fastener according to the present invention is used to fasten the skin of the aircraft and the structural member.

(3) The shaft portion 2 of the lightning-protection fastener 31 is put (inserted) into the hole 16 coated with the sealing material 18, and the collar 17 (see FIG. 1) is screwed onto the male screw portion 2a that protrudes inward (to the back surface side) from the structural member 11 (see FIG. 7C).

Figure 7D:
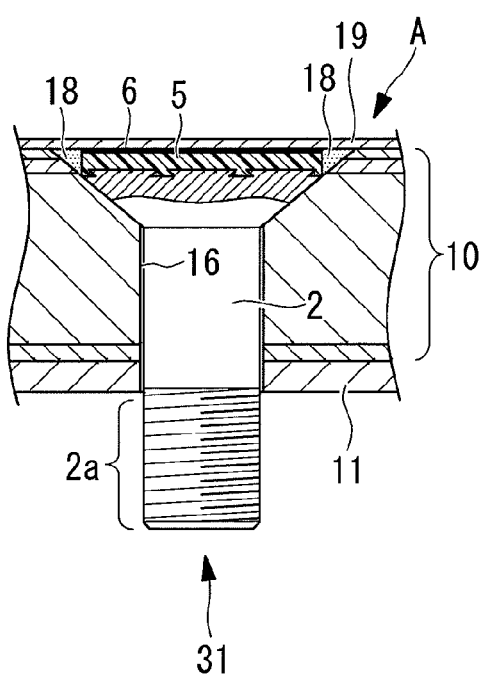
FIG. 7D is an explanatory diagram for explaining the installation method when the lightning-protection fastener according to the present invention is used to fasten the skin of the aircraft and the structural member.
Figure 9:
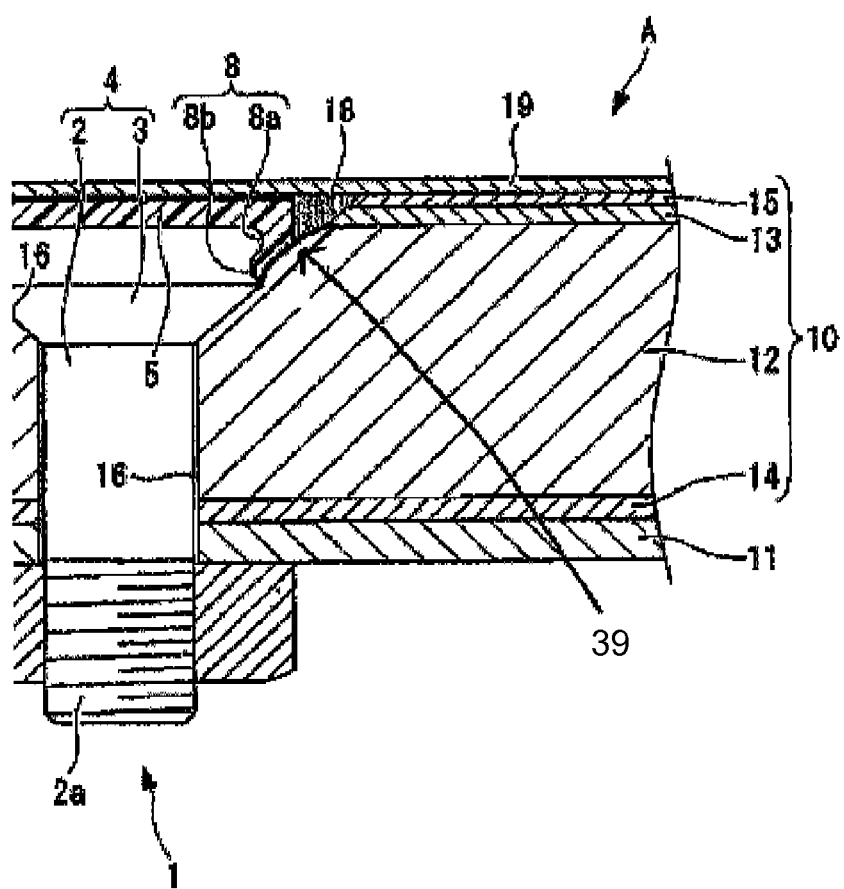
FIG. 9 is a cross-sectional view of an aircraft assembly showing a state in which a skin and a structural member are fastened by a lightning-protection fastener according to another embodiment of the present invention.

(4) The aluminum tape 19 is applied to the surface of the lightning-protection fastener 31 (in more detail, the surface of the conductive layer 6), the surface of the sealing material 18, and the surface of the conductive mesh 15 (see FIG. 7D).

Note that the present invention is not limited to the embodiments described above, and various modifications can be made without departing from the gist of the present invention.

For example, the conductive layer 6 is not an essential element in the lightning-protection fastener according to the present invention and can be omitted. That is, the surface of the insulation layer 5 and the surface of the conductive mesh 15 can be configured so as to be positioned in the same plane (so as to be flush with each other).

In addition, the lightning-protection fastener according to the present invention is not used only for fastening the structural member 11 and the skin 10 of the aircraft as shown in FIG. 1; it can also be used, for example, to fasten the structural member 11 and a skin 50 of an aircraft as shown in FIG. 8.

The skin 50 is made mainly of plastic material (for example, CFRP (carbon-fiber reinforced plastic), referred to as "CFRP" hereafter) 12 having conductivity (conductivity of about $\frac{1}{100}$ to $\frac{1}{1000}$ that of aluminum), whose entire surface (the surface located on the outside after assembly) is laminated with a conductive member (for example, copper) 51 and whose entire back surface (the surface located on the inside after assembly) is laminated with plastic material 14 having insulating properties (for example, GFRP (glass-fiber cured plastic), referred to as "GFRP" hereafter).

Additionally, the entire surface of the conductive member 51 located on the front surface side of the CFRP 12 is laminated with a plastic material 52 having insulating properties (for example, GFRP (glass-fiber cured plastic)).

The invention claimed is:

1. A lightning-protection fastener that fastens a skin of an aircraft and a structural member positioned inside the skin, the skin being constituted of conductive plastic material as a main element and having a conductive member laminated outside thereof, the lightning-protection fastener comprising:

a fastener main body having a head portion, the head portion having an engagement portion formed on an outer circumferential side surface of the head portion; and
an insulation layer which is directly melt adhered to and covers an axial end surface of the head portion, and which is also directly melt adhered to, mechanically engaged with and covers the engagement portion formed on the outer circumferential side surface such that the insulation layer is in direct contact with the axial end surface of the head portion and the engagement portion,
wherein the engagement portion and the axial end surface of the head portion covered with the insulation layer are insulated from the surrounding conductive member,
wherein a circumferential edge portion of the engagement portion has a convex portion along a circumferential direction, the convex portion protruding radially outward,
wherein the convex portion has a round shape along the circumferential direction when seen in a longitudinal section view,
wherein the fastener main body includes a shaft portion on an opposite side of the head portion with respect to the convex portion, and wherein the circumferential edge portion of the engagement portion has a concave portion along the circumferential direction, the concave portion being depressed radially inward and connecting the convex portion and the shaft portion, the concave portion being located below the convex portion.

2. The lightning-protection fastener according to claim 1, wherein the insulation layer is formed by insert molding.

3. The lightning-protection fastener according to claim 1, wherein the insulation layer is formed so as to surround the circumferential edge portion of the engagement portion.

4. The lightning-protection fastener according to claim 1, wherein pre-processing for forming fine surface roughness is applied to at least a part of a surface of the engagement portion.

5. The lightning-protection fastener according to claim 1, wherein the insulation layer is formed of material having—adhesion promoting—properties with a surface of the engagement portion.

6. The lightning-protection fastener according to claim 1, which is used as a fastener that fastens the skin of the aircraft in which plastic material having an insulating property is laminated between the conductive plastic material and the conductive member, and the structural member positioned inside the skin.

7. The lightning-protection fastener according to claim 1, wherein the insulation layer comprises a first layer that covers a surface of the engagement portion and a second layer that covers the first layer, and the first layer is formed of material having—adhesion promoting—properties with the surface of the engagement portion.

8. The lightning-protection fastener according to claim 7, wherein the insulation layer is formed by insert molding being performed multiple times.

9. A lightning-protection fastener that fastens a skin of an aircraft and a structural member positioned inside the skin, the skin being constituted of plastic material as a main element and having a conductive member laminated outside thereof, the lightning-protection fastener comprising:
a fastener main body having a head portion, the head portion having an engagement portion tanned on an end surface of the head portion; and
an insulation layer which covers the end surface of the head portion such that the end surface of the head portion is insulated from the surrounding conductive member,
wherein a circumferential edge portion of the engagement portion formed on the end surface of the head portion has a convex portion along a circumferential direction, the convex portion protruding radially outward,
wherein the convex portion has a round shape along the circumferential direction when seen in a longitudinal section view,
wherein the fastener main body includes a shaft portion on an opposite side of the head portion with respect to the convex portion, and wherein the circumferential edge portion of the engagement portion has a concave portion along the circumferential direction, the concave portion being depressed radially inward and connecting the convex portion and the shaft portion, the concave portion being located below the convex portion.

10. An aircraft assembly comprising:
a skin constituted of conductive plastic material as a main element;
a structural member that supports the skin from inside; and
a fastener that fastens the skin and the structural member, wherein the fastener is the lightning-protection fastener according to claim 1.

11. The aircraft assembly according to claim 10, wherein a gap between the lightning-protection fastener and the skin is filled with sealing material.

12. The aircraft assembly according to claim 10, wherein the insulation layer is formed so as to create a gap between an inner circumferential surface of a hole bored through the skin and an outer circumferential surface of the insulation layer that opposes the inner circumferential surface of the hole such that the insulation layer is not in contact with the skin.

13. The aircraft assembly according to claim 10, wherein a top surface of the insulation layer and a surface of the skin are processed to be flush with each other.

14. An aircraft assembly comprising:
a skin constituted of conductive plastic material as a main element; a structural member that supports the skin from inside; and
the lightning-protection fastener according to claim 9 that fastens the skin and the structural member.

15. The aircraft assembly according to claim 10, further comprising a conductive member laminated outside of the conductive plastic material, wherein plastic material having an insulating property is laminated between the conductive plastic material and the conductive member.

16. An aircraft assembly comprising:
a skin which includes conductive plastic material as a main element;
a structural member that supports the skin from inside; and
a lightning-protection fastener that fastens the skin and the structural member, wherein the lightning-protection fastener includes
a fastener main body having a head portion, the head portion having an engagement portion formed on an outer circumferential side surface of the head portion, and
an insulation layer which is attached to and covers an axial end surface of the head portion, and which is attached to and covers the engagement portion formed on the outer circumferential side surface,
wherein a circumferential edge portion of the engagement portion formed on the outer circumferential side surface of the head portion has a convex portion along a circumferential direction, the convex portion protruding radially outward and having a round shape along the circumferential direction when seen in a longitudinal section view, wherein a gap between the insulation layer and the skin is filled with sealing material so as to be in —direct— contact with the insulation layer and the skin, the sealing material being in an inverted triangular shape having a larger width and a larger area toward a surface of the skin when seen in a longitudinal section view such that formation of a space between the sealing material and the insulation layer or a space between the sealing material and the skin is prevented, wherein the fastener main body includes a shaft portion on an opposite side of the head portion with respect to the convex portion, and wherein the circumferential edge portion of the engagement portion has a concave portion along the circumferential direction, the concave portion being depressed radially inward and connecting the convex portion and the shaft portion, the concave portion being located below the convex portion.

17. An aircraft assembly comprising:

a skin which includes conductive plastic material as a main element;

a structural member that supports the skin from inside; and a lightning-protection fastener that fastens the skin and the structural member, wherein the lightning-protection fastener includes a fastener main body having a head portion, the head portion having an engagement portion formed on an outer circumferential side surface of the head portion, and an insulation layer which covers an axial end surface of the head portion and which covers the engagement portion formed on the outer circumferential side surface, wherein the engagement portion and the axial end surface of the head portion covered with the insulation layer are insulated from the skin, wherein the insulation layer is formed so as to create a gap between an inner circumferential surface of a hole bored through the skin and an outer circumferential surface of the insulation layer that opposes the inner circumferential surface of the hole such that the insulation layer is not in contact with the skin, wherein a circumferential edge portion of the engagement portion has a convex portion along a circumferential direction, the convex portion protruding radially outward, wherein the convex portion has a round shape along the circumferential direction when seen in a longitudinal section view, wherein the fastener main body includes a shaft portion on an opposite side of the head portion with respect to the convex portion, and wherein the circumferential edge portion of the engagement portion has a concave portion along the circumferential direction, the concave portion being depressed radially inward and connecting the convex portion and the shaft portion, the concave portion being located below the convex portion.

18. An aircraft assembly comprising:

a skin which includes conductive plastic material as a main element;

a structural member that supports the skin from inside; and a lightning-protection fastener that fastens the skin and the structural member, wherein the lightning-protection fastener includes a fastener main body having a head portion, the head portion having an engagement portion formed on an outer circumferential side surface of the head portion, and an insulation layer which is directly melt adhered to and covers an axial end surface of the head portion and which is also directly melt adhered to, mechanically engaged with and covers the engagement portion formed on the outer circumferential side surface such that the insulation layer is in direct contact with the axial end surface of the head portion and the engagement portion, wherein the engagement portion and the axial end surface of the head portion covered with the insulation layer are insulated from the skin, wherein a circumferential edge portion of the engagement portion has a convex portion along a circumferential direction, the convex portion protruding radially outward, wherein the convex portion has a round shape along the circumferential direction when seen in a longitudinal section view, wherein the fastener main body includes a shaft portion on an opposite side of the head portion with respect to the convex portion, and wherein the circumferential edge portion of the engagement portion has a concave portion along the circumferential direction, the concave portion being depressed radially inward and connecting the convex portion and the shaft portion, the concave portion being located below the convex portion.

19. The aircraft assembly according to claim 1, wherein the insulation layer is formed by insert molding.

20. The aircraft assembly according to claim 18, wherein the insulation layer is formed so as to create a gap between an inner circumferential surface of a hole bored through the skin and an outer circumferential surface of the insulation layer that opposes the inner circumferential surface of the hole such that the insulation layer is not in contact with the skin.

21. A method of manufacturing a lightning-protection fastener that fastens a skin of an aircraft and a structural member positioned inside the skin, the skin being constituted of conductive plastic material as a main element and having a conductive member laminated outside thereof, the lightning-protection fastener having a head portion and a fastener main body including a shaft portion, said method comprising:

forming an engagement portion on an outer circumferential side surface of the head portion such that a circumferential edge portion of the engagement portion has a convex portion along a circumferential direction, the convex portion protruding radially outward, the convex portion having a round shape along the circumferential direction when seen in a longitudinal section view, and such that the circumferential edge portion of the engagement portion has a concave portion along the circumferential direction, the concave portion being depressed radially inward and connecting the convex portion and the shaft portion, the concave portion being located below the convex portion; and melt adhering an insulation layer directly to an axial end surface of the head portion so as to cover the axial end surface of the head portion, and melt adhering the insulation layer directly to the engagement portion formed on the outer circumferential side surface so as to cover and be mechanically engaged with the engagement portion, wherein the insulation layer is in direct contact with the axial end surface of the head portion and the engagement portion, and wherein the engagement portion and the axial end surface of the head portion covered with the insulation layer are insulated from the surrounding conductive member.

* * * * *